(12) United States Patent
Chung et al.

(10) Patent No.: US 11,047,231 B2
(45) Date of Patent: Jun. 29, 2021

(54) BOREHOLE PRESSURE-SHEAR TEST APPARATUS CAPABLE OF MEASURING HORIZONTAL DISPLACEMENT BY BOREHOLE WALL PRESSING CONFIGURATION USING WEDGE ELEMENT

(71) Applicant: SEOUL NATIONAL UNIVERSITY R&DB FOUNDATION, Seoul (KR)

(72) Inventors: Choong-Ki Chung, Seoul (KR); Seung Hwan Lee, Seoul (KR); Young Woo Song, Ansan-si (KR); Jae Gyu Kim, Seoul (KR); Bae Lee, Seoul (KR); Won Chan Lee, Seoul (KR)

(73) Assignee: SEOUL NATIONAL UNIVERSITY R & DB FOUNDATION, Seoul (KR)

( * ) Notice: Subject to any disclaimer, the term of this patent is extended or adjusted under 35 U.S.C. 154(b) by 1 day.

(21) Appl. No.: 16/647,017

(22) PCT Filed: May 16, 2019

(86) PCT No.: PCT/KR2019/005882
§ 371 (c)(1),
(2) Date: Mar. 12, 2020

(87) PCT Pub. No.: WO2020/101132
PCT Pub. Date: May 22, 2020

(65) Prior Publication Data
US 2021/0115790 A1    Apr. 22, 2021

(30) Foreign Application Priority Data
Nov. 15, 2018  (KR) .................. 10-2018-0140662

(51) Int. Cl.
| | | |
|---|---|---|
| E21B 49/00 | (2006.01) | |
| E21B 37/02 | (2006.01) | |
| G01N 3/24 | (2006.01) | |

(52) U.S. Cl.
CPC ............ *E21B 49/006* (2013.01); *E21B 37/02* (2013.01); *G01N 3/24* (2013.01);
(Continued)

(58) Field of Classification Search
CPC ...... E21B 7/061; E21B 43/103; E21B 49/006; E21B 37/02; G01N 3/24; G01N 2203/0025; G01N 2203/0423; G01N 2203/0494
(Continued)

(56) References Cited

U.S. PATENT DOCUMENTS

| | | | | |
|---|---|---|---|---|
| 4,075,885 A | * | 2/1978 | Handy | ............... E02D 1/022 73/784 |
| 4,202,416 A | * | 5/1980 | Blaschke | ............... E21B 4/18 173/33 |
| 4,773,259 A | * | 9/1988 | Handy | ............... E02D 1/022 73/784 |

FOREIGN PATENT DOCUMENTS

| | | |
|---|---|---|
| JP | 2008-8085 A | 1/2008 |
| JP | 2012-145335 A | 8/2012 |

(Continued)

OTHER PUBLICATIONS

Chang-Guk Sun et al. Reliable Evaluation of Dynamic Ground Properties from Cross-hole Seismic Test using Spying-loaded Lateral Impact Source, Journal of the Earthquake Engineering Society of Korea, 2006, vol. 10, No. 4, pp. 1-13.

*Primary Examiner* — Octavia Hollington
(74) *Attorney, Agent, or Firm* — Goldilocks Zone IP Law (57) ABSTRACT

A borehole shear test apparatus of the present disclosure includes a main casing, a horizontal loading module and
(Continued)

shear plates, and performs both a borehole shear test and a borehole jack test by calculating and measuring horizontal displacement produced at a borehole wall when pressed by the shear plates, and at the same time, measuring a vertical load applied when a wedge element moves down.

3 Claims, 11 Drawing Sheets (52) U.S. Cl.
 CPC ........... *G01N 2203/0025* (2013.01); *G01N 2203/0423* (2013.01); *G01N 2203/0494* (2013.01)

(58) Field of Classification Search
 USPC .......................................................... 73/841
 See application file for complete search history.

(56) References Cited

FOREIGN PATENT DOCUMENTS

| | | |
|---|---|---|
| JP | 2015-218841 A | 12/2015 |
| KR | 20-0232184 Y1 | 7/2001 |
| KR | 10-0782105 B1 | 12/2007 |
| KR | 20-2008-0003523 U | 8/2008 |
| KR | 10-2013-0013554 A | 2/2013 |
| KR | 10-1272787 B1 | 6/2013 |
| KR | 10-1352286 B1 | 1/2014 |
| KR | 10-1571755 B1 | 11/2015 |

\* cited by examiner

BOREHOLE PRESSURE-SHEAR TEST APPARATUS CAPABLE OF MEASURING HORIZONTAL DISPLACEMENT BY BOREHOLE WALL PRESSING CONFIGURATION USING WEDGE ELEMENT

CROSS-REFERENCE TO RELATED APPLICATIONS

This application claims the benefit under 35 U.S.C. section 371, of PCT international application No.: PCT/KR2019/005882, filed on May 16, 2019, which claims foreign priority to Korean Patent Application No.: 10-2018-0140662, filed on Nov. 15, 2018, in the Korean intellectual property office, both of which are hereby incorporated by reference in their entireties.

TECHNICAL FIELD

The present disclosure relates to a borehole pressure-shear test apparatus inserted into a borehole formed in the ground to perform a shear test on the borehole wall.

The present disclosure is funded by construction technology research project titled "Development of life cycle engineering and construction method for strengthening global competitiveness of cable stayed bridge (Project serial number: 18SCIP-B119960-03) (Project period: Sep. 26, 2016 to Sep. 25, 2021)" in Ministry of Land, Infrastructure and Transport under the government-funded research and development program.

BACKGROUND ART

As an approach to determining the shear strength of the ground, a borehole shear test is used in which a borehole is formed in the ground, a test apparatus is inserted into the borehole, a shear force is applied to the borehole wall, and the shear strength of the ground is measured. To determine the engineering properties of the ground, a borehole jack test is also performed. The borehole jack test is to insert a test apparatus that expands in the radial direction into the borehole, applies pressure against the borehole wall in the horizontal direction by expanding the test apparatus, and measure the horizontal load applied at this time and displacement in the horizontal direction (horizontal displacement) produced at the borehole wall by the applied pressure.

The existing borehole shear test apparatus only has a configuration applying a shear force to borehole wall by simply using shear plates. The existing borehole shear test apparatus does not have any configuration for accurately measuring the horizontal load applied to the borehole wall and the resulting horizontal displacement of the borehole wall. Accordingly, to perform the borehole shear test and the borehole jack test using earlier technology, each separate test apparatus is needed, and accordingly there is considerable inconvenience in the tests.

DISCLOSURE

Technical Problem

The present disclosure is directed to providing a borehole pressure-shear test apparatus for performing a borehole shear test as well as a borehole jack test.

Technical Solution

A borehole pressure-shear test apparatus according to the present disclosure includes a configuration for a borehole wall shear test, and further includes a configuration for measuring a horizontal load when shear plates press tightly against the borehole wall and its resulting horizontal displacement of the borehole wall to measure the shear strength of the borehole wall.

Advantageous Effects

According to the present disclosure, it is possible to measure the shear strength of the borehole wall by performing a borehole shear test using the shear plates. In addition, it is possible to accurately calculate and measure the horizontal displacement of the borehole wall when pressed by the shear plates by measuring the horizontal displacement of the shear plates. Moreover, the present disclosure may measure the horizontal load applied to the borehole wall by measuring the vertical load applied to the wedge element by the vertical load meter.

Accordingly, using the borehole pressure-shear test apparatus of the present disclosure, it is possible to perform a borehole shear test and a borehole jack test together, and perform an on-site test on the ground using one test apparatus very quickly, accurately and efficiently.

Furthermore, if necessary, the present disclosure may further include a cleaning module to clean the shear plates. With the cleaning module, it is possible to clean up the shear plates by automatically removing impurity buildup in the shear plates through manipulation in the ground without pulling the borehole pressure-shear test apparatus out of the borehole in the ground after the test is completed. Accordingly, according to the present disclosure, it is possible to perform a borehole shear test continuously and efficiently.

BEST MODE

The present disclosure provides a borehole pressure-shear test apparatus including a cylindrical main casing having an open window on a wall, a horizontal loading module provided within the main casing to convert a vertical load to a horizontal load and apply the horizontal load, and a pair of shear plates to come into close contact with and shear a borehole wall of a borehole in ground by advancing and retreating in horizontal direction through the open window of the main casing by the action of the horizontal force of the horizontal loading module, wherein the horizontal loading module includes a loading motor, a connecting rod that vertically moves up and down by the loading motor, a vertical load meter to measure a vertical load applied by the connecting rod moving up and down, and a wedge element coupled with the connecting rod to cause the shear plates to advance and retreat in a horizontal direction with moving vertically, the wedge element has a downward tapered shape such that a distance between two edges is narrower as it goes downwards, the pair of shear plates are each slidably fastened to the two edges of the wedge element, when the connecting rod and the wedge element move down by the loading motor, the pair of shear plates are subjected to the horizontal force and horizontally advance at the same time to press tightly the borehole wall, and horizontal displacement of the borehole wall when pressed by the shear plates is calculated and measured by measuring a vertical displacement at which the connecting rod or the wedge element moved down and calculating a displacement of the shear plates by calculation based on a geometric shape of the wedge element, and at the same time, a horizontal load applied to the borehole wall is measured by measuring the vertical load applied when the wedge element moves down by the vertical load meter, and the connecting rod and the wedge element are configured to move up by the operation of the loading motor to retreat the pair of shear plates inwards after a test is completed, and a borehole shear test for measuring the shear strength of the ground by shearing the borehole wall, and a borehole jack test for measuring the horizontal load applied to the borehole wall by the shear plates and its consequential horizontal displacement of the borehole wall are all performed.

In the borehole pressure-shear test apparatus of the present disclosure, protrusion-type rails are continuously formed at the two edges of the wedge element, fastening elements are provided on inner surfaces of the shear plates such that the fastening elements surround the rails, and the fastening elements always maintain a fastened state surrounding the rails such that when the fastening elements surround the rails, the fastening elements can freely move along the rails, but the fastening elements cannot move in a direction perpendicular to the rails, so the shear plates can move along the edges of the wedge element.

Moreover, the borehole pressure-shear test apparatus may further include a cleaning module to clean up to remove impurities stuck in front surfaces of the shear plates having retreated in the horizontal direction after shearing is completed, wherein the cleaning module includes an upper rotation support ring and a lower rotation support ring surrounding a circumference of the main casing above and below the open window of the main casing respectively, a plurality of vertical connection elements integrally connecting the upper and lower rotation support rings, cleaning pads provided on inner surfaces of all or some of the vertical connection elements, and a cleaning rotation driving module to rotate an integrated assembly including the upper and lower rotation support rings and the vertical connection elements, and while the cylindrical assembly including the upper and lower rotation support rings and the vertical connection elements rotates by operation of the cleaning rotation driving module, the cleaning pads clean up the front surfaces of the shear plates by wiping. Particularly, in this case, the cleaning rotation driving module includes a gear rotation ring having gears on a circumferential inner surface and rotatably provided within the main casing above the upper rotation support ring integrally with the upper rotation support ring, a motor having a rotating gear in gear engagement with the gear rotation ring to drive the rotating gear to rotate, and a fixed ring element disposed within the main casing and to which the motor is fixed, and when the motor operates, the rotating gear rotates, and accordingly the gear rotation ring in gear engagement with the rotating gear rotates, and the assembly of the upper and lower rotation support rings and the vertical connection elements coupled with the gear rotation ring rotates around the main casing.

MODE FOR INVENTION

Hereinafter, preferable embodiments of the present disclosure will be described with reference to the accompanying drawings. While the present disclosure is described with reference to the embodiments shown in the drawings, this is described as one embodiment, and the technical spirit of the present disclosure and its essential elements and operations are not limited thereby.

Figure 1:
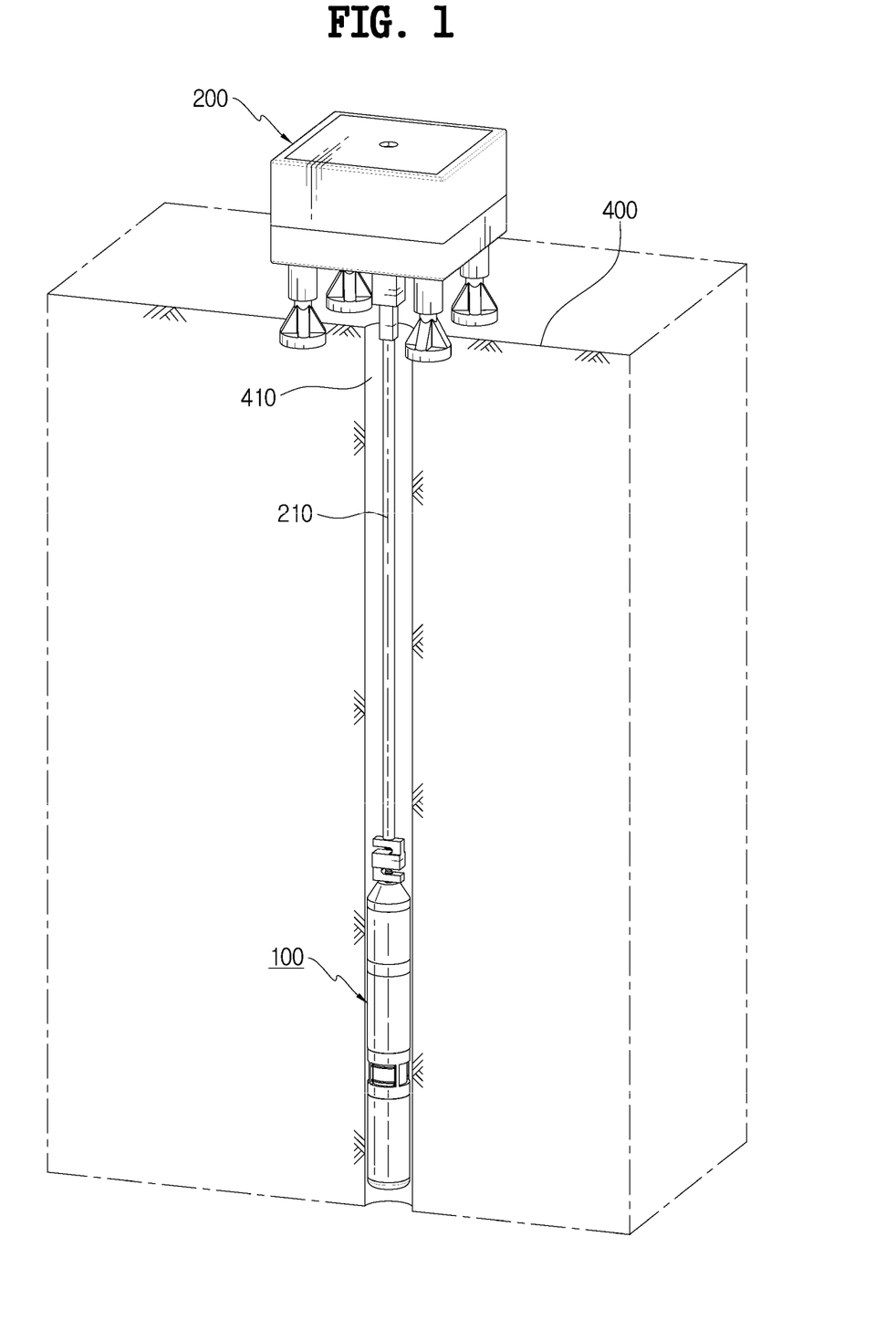
FIG. 1 is a schematic sectional perspective view of a borehole pressure-shear test apparatus of the present disclosure inserted and placed into a borehole in the ground.
Figure 2:
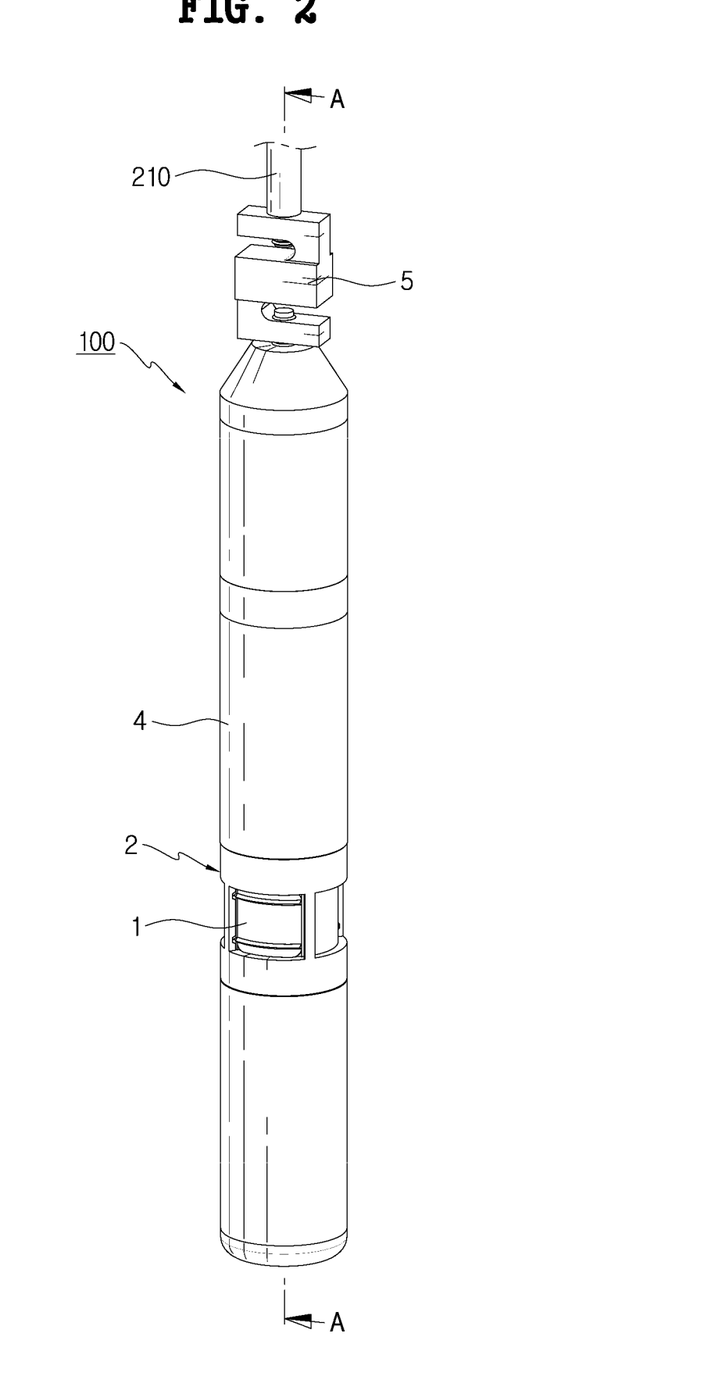
FIG. 2 is a schematic perspective view of the borehole pressure-shear test apparatus of the present disclosure shown in FIG. 1.
Figure 3:
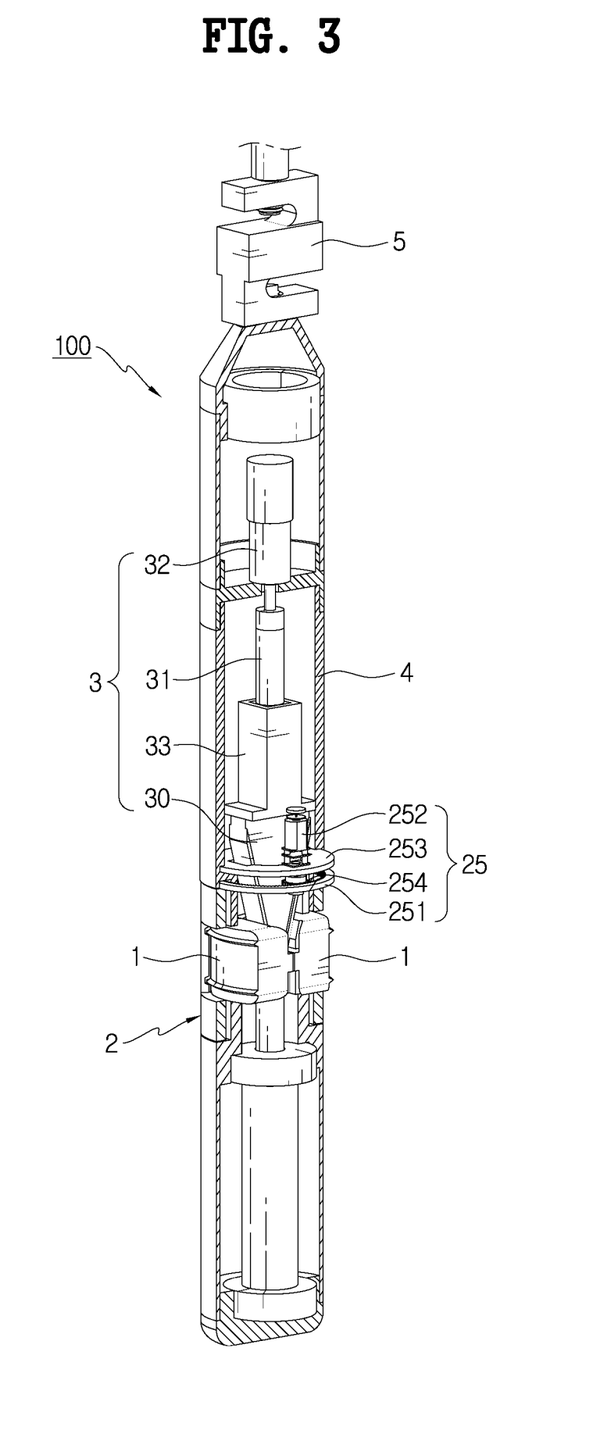
FIG. 3 is a schematic sectional perspective view taken along the line A-A of FIG. 2.
Figure 4:
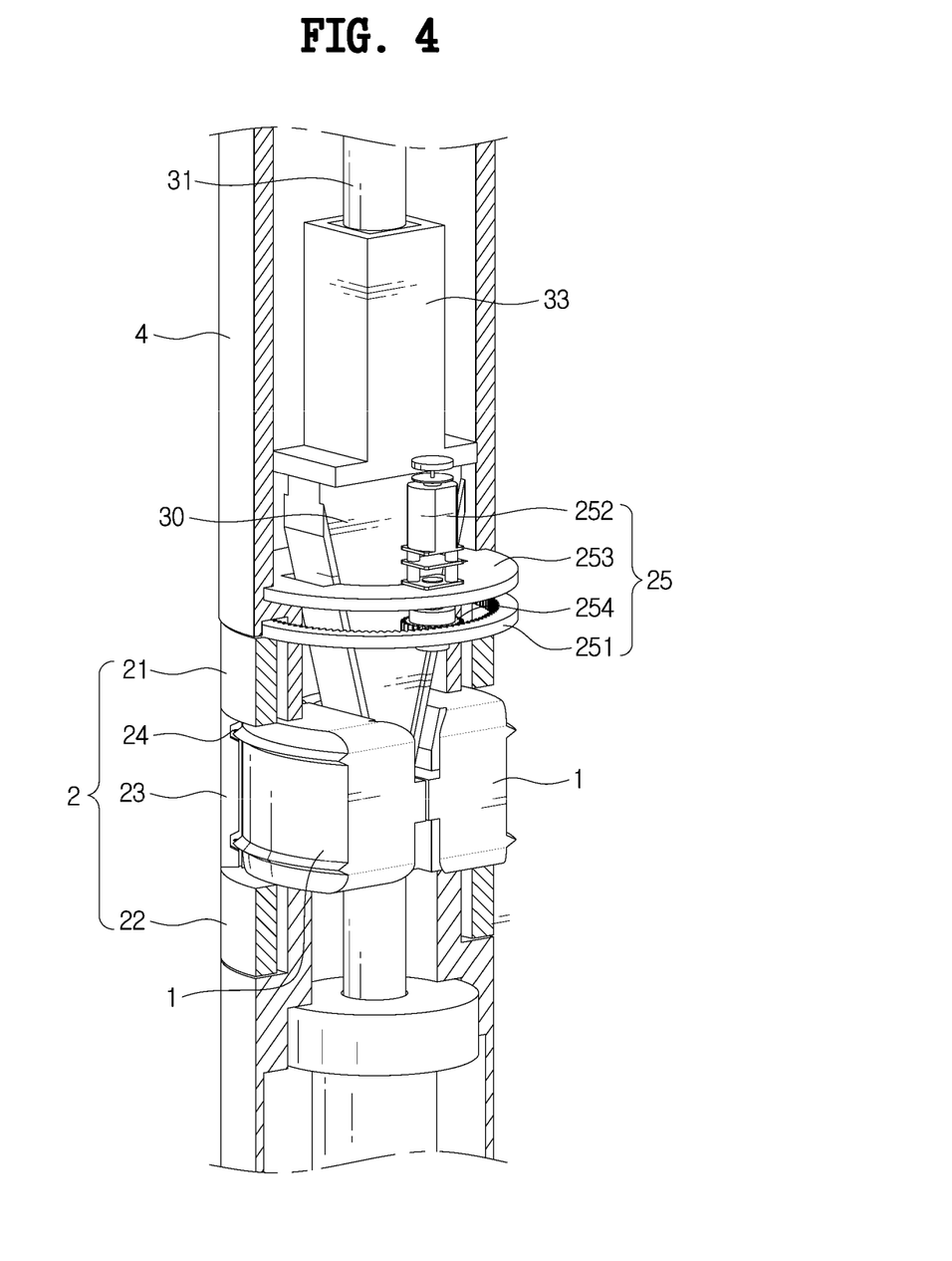
FIG. 4 is a schematic enlarged view of shear plates and a horizontal loading module shown in FIG. 3.

FIG. 1 is a schematic sectional perspective view of a borehole pressure-shear test apparatus 100 of the present disclosure inserted and placed into a borehole in the ground. FIG. 2 is a schematic perspective view of the borehole pressure-shear test apparatus 100 of the present disclosure shown in FIG. 1. FIG. 3 is a schematic sectional perspective view taken along the line A-A of FIG. 2. FIG. 4 is a schematic enlarged view of the shear plates 1 and a horizontal loading module 3 shown in FIG. 3. For convenience, FIGS. 3 and 4 show the shear plates 1 and some elements in a whole view rather than a cross section view.

The borehole pressure-shear test apparatus 100 is inserted into the borehole in the ground and configured to perform both a borehole shear test and a borehole jack test. The borehole pressure-shear test apparatus 100 is coupled to the bottom of a rod 210. The rod 210 is connected to a driving device 200 placed on the ground. The borehole pressure-shear test apparatus 100 includes a cylindrical main casing 4, a horizontal loading module 3 and a pair of shear plates 1.

The horizontal loading module 3 is placed within the main casing 4 to convert a vertical load to a horizontal load and apply the horizontal load. The pair of shear plates 1 are advanced or retreated in the horizontal direction by the horizontal loading module 3 so that the pair of shear plates 1 come into close contact with the borehole wall of the borehole in the ground or go far away from the borehole wall. If necessary, the borehole pressure-shear test apparatus 100 may further include a cleaning module 2 surrounding part of the main casing 4 in which the shear plates 1 are installed. The cleaning module 2 automatically removes impurities such as the remaining soil stuck in the shear plates 1 by wiping up the front surfaces of the shear plates 1 by rotation. A tensile load meter 5 may be provided above the main casing 4. The tensile load meter 5 may be disposed between rod 210 connected to the driving device 200 and the main casing 4. The tensile load meter 5 measures the tensile load applied when pulling up the borehole pressure-shear test apparatus 100 in the vertical direction with the shear plates 1 being pressed tightly against the borehole wall for a borehole shear test. The tensile load meter 5, may include, for example, a load cell.

The horizontal loading module 3 is placed in the internal space of the main casing 4. The horizontal loading module 3 generates a vertical load and applies a horizontal load to the shear plates 1 to advance and retreat the shear plates 1 in the horizontal direction. The main casing 4 has an open window at each of the opposite locations on the wall. Each shear plate 1 is coupled to the horizontal loading module 3. The shear plates 1 advance and retreat in the horizontal direction through the open windows. The horizontal loading module 3 generates a vertical load, and at the same time, converts the vertical load to a horizontal load to simultaneously push the pair of shear plates 1 in the outward direction of the main casing 4. Accordingly, the shear plates 1 advance in the horizontal direction through the open windows and come into close contact with the borehole wall of the borehole in the ground. After the borehole shear test ends, an upward vertical load from the ground acts, and accordingly the pair of shear plates 1 move in the horizontal direction back to the original location by the operation of the horizontal loading module 3.

The horizontal loading module 3 includes a loading motor 32, a connecting rod 31, a vertical load meter 33, and a wedge element 30. The connecting rod 31 is connected to the loading motor 32. The connecting rod 31 moves in the vertical direction by the rotation of the loading motor 32. The vertical load meter 33 measures a vertical load applied by the vertical movement of the connecting rod 31. The wedge element 30 is coupled with the connecting rod 31. The wedge element 30 moves vertically causing the shear plates 1 to advance and retreat in the horizontal direction. In the embodiment shown in the drawing, the vertical load meter 33 is provided between the connecting rod 31 and the wedge element 30.

Figure 5:
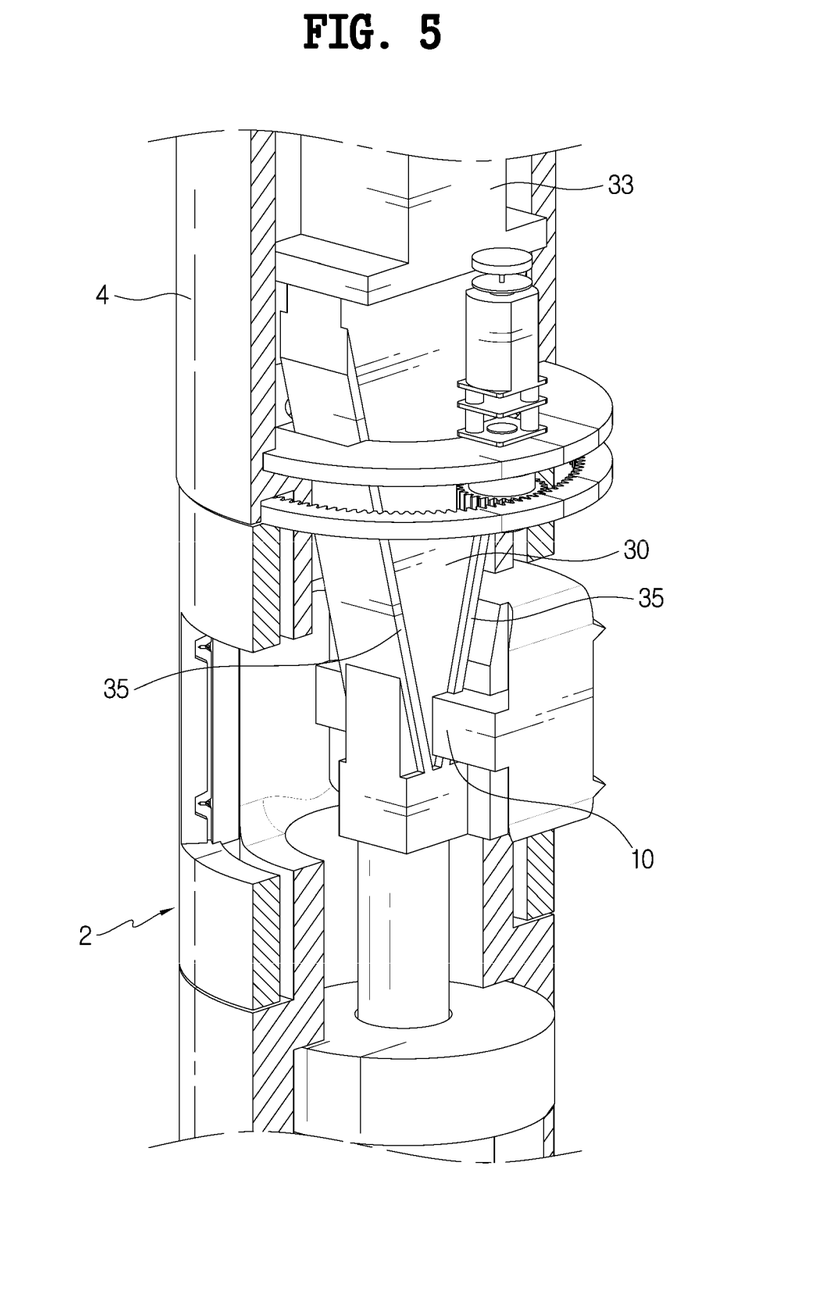
FIGS. 5 and 6 are schematic enlarged perspective views of a wedge element and a shear plate coupled to each other in the present disclosure.
Figure 6:
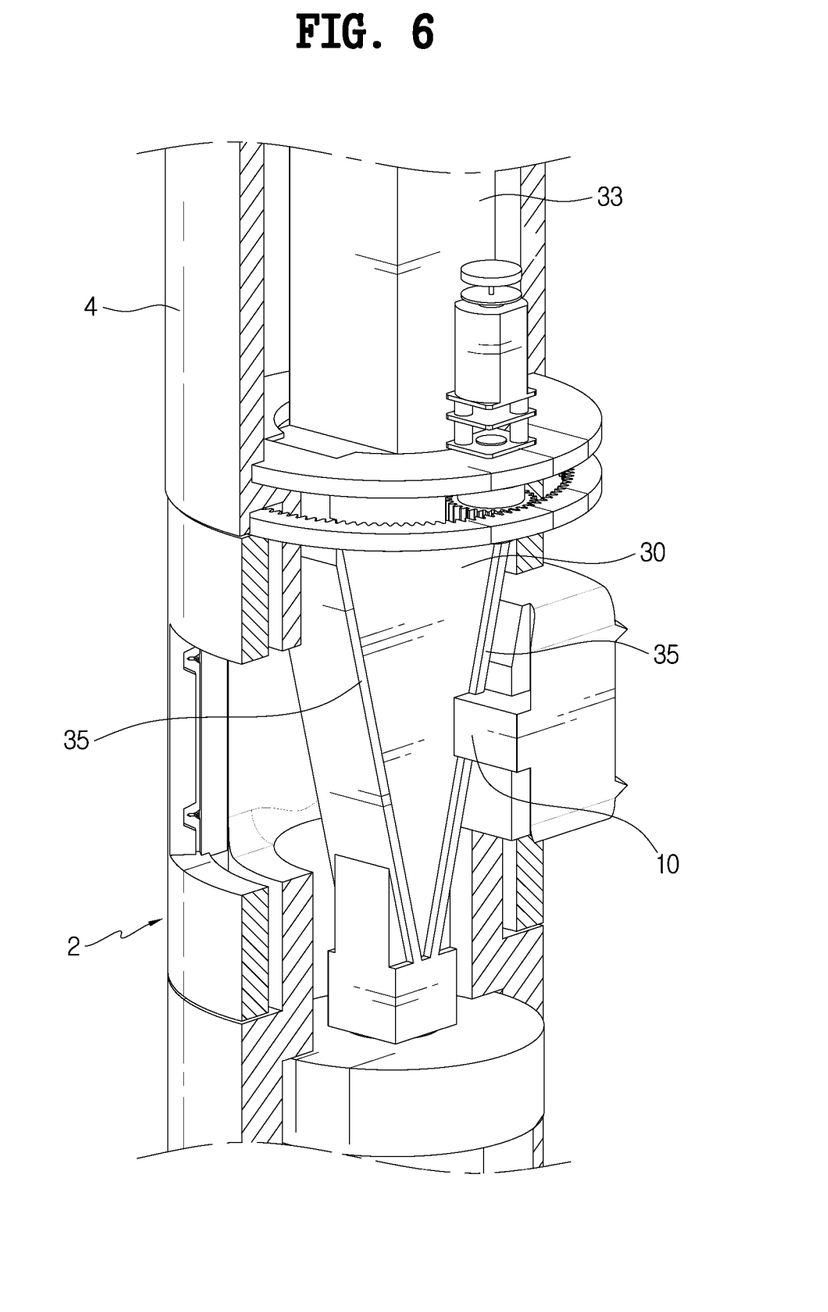

The wedge element 30 has a downward tapered shape such that the cross section size reduces as it goes downwards. The edge of the wedge element 30 slopes such that the distance between two edges is narrower as it goes downwards. Each of the pair of shear plates 1 are movably coupled to the both lateral edges of horizontal direction of the wedge element 30. FIGS. 5 and 6 are schematic enlarged perspective views of the wedge element 30 and the shear plate 1 coupled to each other. FIG. 5 shows the wedge element 30 before it moves down, i.e., the shear plate 1 at the initial location. FIG. 6 shows that as the wedge element 30 moves down, the shear plate 1 advances in the horizontal direction toward the borehole wall. For convenience, one shear plate is omitted in FIGS. 5 and 6.

In the embodiment shown in FIGS. 5 and 6, a protrusion-type rail 35 is continuously formed along the edges of the downward tapered part of the wedge element 30. A fastening element 10 is provided on an inner surface of the shear plate 1, i.e., a coupled surface with the wedge element 30, and surrounds the rail 35. When the fastening element 10 surrounds the rail 35, the fastening element 10 can freely move along the rail 35, but cannot move in a direction perpendicular to the rail 35. That is, the fastening element 10 always maintains a fastened state surrounding the rail 35, and in this fastened state, the fastening element 10 can move along the rail 35. Accordingly, the shear plate 1 may make a relative movement along the edge of the wedge element 30 and advance and retreat in the horizontal direction.

Figure 7:
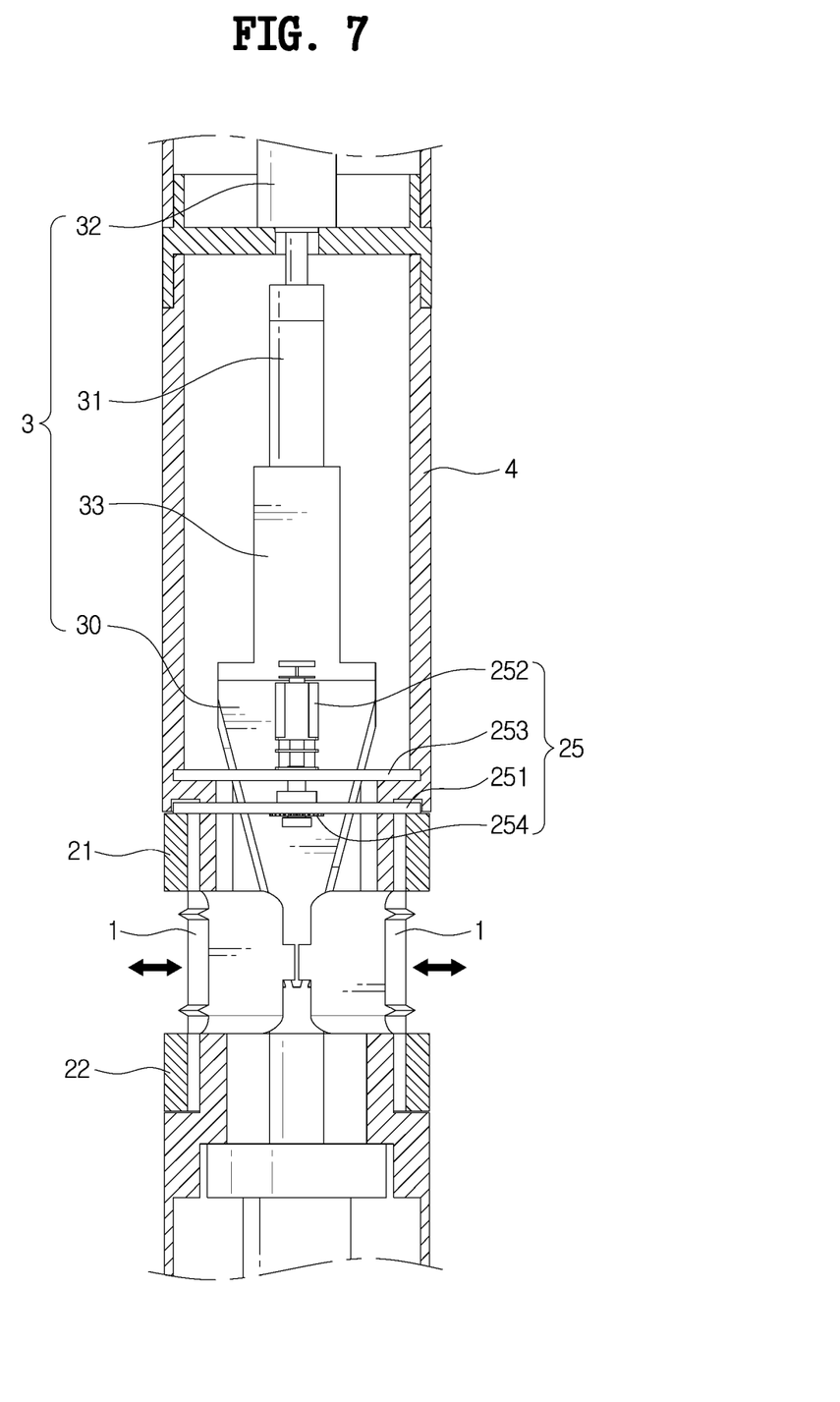
FIGS. 7 and 8 are schematic side views corresponding to the sectional perspective view of FIG. 4.
Figure 8:
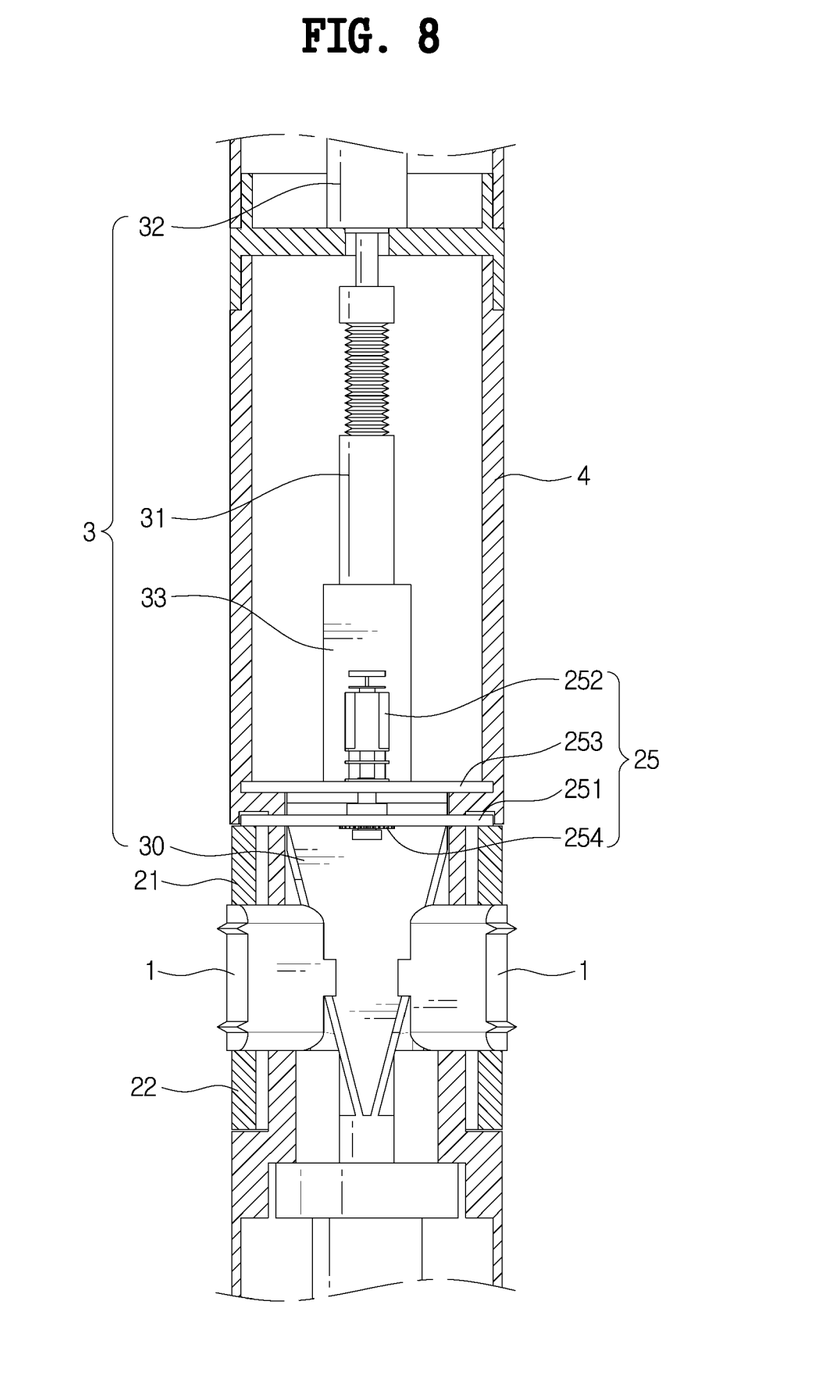

Each of FIGS. 7 and 8 is a schematic sectional view taken along the line A-A of FIG. 2. FIGS. 7 and 8 are schematic side views corresponding to the sectional perspective view of FIG. 4. When a downward vertical load acts, the loading motor 32 operates and the connecting rod 31 moves down. When the connecting rod 31 moves down, the wedge element 30 moves down as shown in FIG. 8. Each of the pair of shear plates 1 is coupled to the edge of the wedge element 30 by the fastening structure between the rail 35 and the fastening element 10. When the wedge element 30 moves down with the shear plate 1 being inserted into the open window of the main casing 4, the fastening element 10 of the shear plate 1 relatively moves up along the rail 35. The wedge element 30 has a downward tapered shape such that the cross section size reduces as it goes downwards. Accordingly, when the fastening element 10 moves up along the rail 35, the fastening element 10 and the shear plate 1 coupled thereto advance horizontally to the borehole wall of the borehole in the ground.

On the contrary, when an upward vertical load acts, the loading motor 32 operates and the connecting rod 31 moves up. Accordingly, the wedge element 30 moves up, and the fastening element 10 of the shear plate 1 moves down along the rail 35. Since the wedge element 30 has a downward tapered shape, the rails 35 formed at each of both edges of the wedge element 30 get closer to each other as they go downwards. Accordingly, the pair of fastening elements 10 also get closer to each other while moving down along the rails 35. Due to this configuration, the pair of shear plates 1 horizontally retreat into the internal space of the main casing 4 at the same time, and return to the initial location (location shown in FIG. 7).

In the present disclosure, since the wedge element 30 and the shear plates 1 are coupled as described above, when a vertical displacement of the wedge element 30 is accurately determined, a horizontal displacement of the shear plates 1 resulting from the vertical movement of the wedge element 30 may be determined accurately through geometric calculation. The vertical displacement of the wedge element 30 may be determined by direct measurement. The vertical movement of the wedge element 30 is equal to the vertical movement of the connecting rod 31. Accordingly, the vertical displacement of the wedge element 30 may be determined by measuring a vertical displacement of the connecting rod 31. However, since vertical movements of the wedge element 30 and the connecting rod 31 are made by the operation of the loading motor 32, when using an encoder motor which can measure displacement by the number of rotations as the loading motor 32, it is possible to determine the vertical displacement of the wedge element 30 and the connecting rod 31 more accurately and very easily by measuring the number of rotations of the loading motor 32. The horizontal loading module 3 includes the vertical load meter 33 to measure a vertical load. Accordingly, a vertical load applied to the wedge element 30 for a vertical movement of the wedge element 30 can be measured by the vertical load meter 33 accurately and quickly. The vertical load meter 33 may include a well-known load cell.

To perform a test in borehole using the borehole pressure-shear test apparatus 100, the driving device 200 is installed on the ground, and the driving device 200 and the rod 210 are connected. The borehole pressure-shear test apparatus 100 is coupled to bottom of the rod 210, and the borehole pressure-shear test apparatus 100 is inserted into the borehole in the ground and placed at a preset location. Subsequently, the horizontal loading module 3 operates to generate a downward vertical load, and at the same time, converts it to a horizontal load and applies the horizontal load to the pair of shear plates 1. Accordingly, as shown in FIG. 8, the pair of shear plates 1 simultaneously move in the outward direction of the main casing 4. The connecting rod 31 and the wedge element 30 move down by the operation of the loading motor 32. Accordingly, by the slidable fastening structure between the rail 35 and the fastening element 10, the pair of shear plates 1 advance horizontally toward the borehole wall of the borehole in the ground at the same time. The shear plates 1 advance in the horizontal direction through the open windows of the main casing 4, and the shear plates 1 are pressed tightly against the borehole wall of the borehole in the ground.

The borehole pressure-shear test apparatus 100 of the present disclosure may measure the vertical displacement at which the connecting rod 31 or the wedge element 30 moved down, and through this, determine the horizontal displacement of the shear plates 1. Accordingly, it is possible to accurately calculate and measure horizontal displacement produced at the borehole wall (horizontal displacement of the borehole wall) when the shear plates 1 are pressed tightly against the borehole wall of the borehole in the ground upon coming into contact with the borehole wall. The vertical load applied to the wedge element 30 acts as a horizontal load against the borehole wall through the shear plates 1. Accordingly, the vertical load applied to the wedge element 30 for a vertical movement of the wedge element 30 may be determined through measurement by the vertical load meter 33, and accordingly the horizontal load applied to the borehole wall can be accurately measured. Of course, the shear strength of the borehole wall may be also measured by performing a borehole shear test in a manner of pulling up the entire borehole pressure-shear test apparatus 100 with the shear plates 1 being pressed tightly against the borehole wall. Using the borehole pressure-shear test apparatus 100 of the present disclosure, it is possible to perform not only a borehole shear test but also a borehole jack test. Accordingly, using the borehole pressure-shear test apparatus 100 of the present disclosure, it is possible to perform an on-site test for determining the engineering properties of the ground very quickly, accurately and efficiently.

After the borehole shear test ends, an upward vertical load is generated by the operation of the horizontal loading module 3. The upward vertical load is converted to a horizontal load to simultaneously pull the pair of shear plates 1 so that the shear plates 1 retreat in the horizontal direction and return to the original location as shown in FIG. 7. The connecting rod 31 and the wedge element 30 move up by the operation of the loading motor 32, and the pair of shear plates 1 are pulled inwards and moved back by the slidable fastening structure between the rail 35 and the fastening element 10.

The shear plates may have sawtooth for shearing the borehole wall on the front surfaces. By this reason, even though the shear plates 1 return to the initial location, impurities such as residual soils formed in the shearing process may exist on the front surfaces of the shear plates 1. When a test is performed in the borehole again in the presence of impurities on the shear plates 1, an inaccurate shear test result may be derived. To perform an additional test, it is necessary to pull the borehole pressure-shear test apparatus out of the borehole in the ground, perform a cleaning task using a cleaning brush to remove impurities attached to the shear plates 1, and insert the borehole pressure-shear test apparatus into the borehole in the ground again.

Optionally, the borehole pressure-shear test apparatus 100 according to the present disclosure may further include the cleaning module 2. With the cleaning module 2, it is possible to clean up the shear plates 1 by automatically removing impurity buildup in the shear plates 1 through simple control signal transmission in the ground without pulling the borehole pressure-shear test apparatus out of the borehole in the ground after the test is completed. Accordingly, it is possible to perform a borehole shear test continuously and efficiently.

Figure 9:
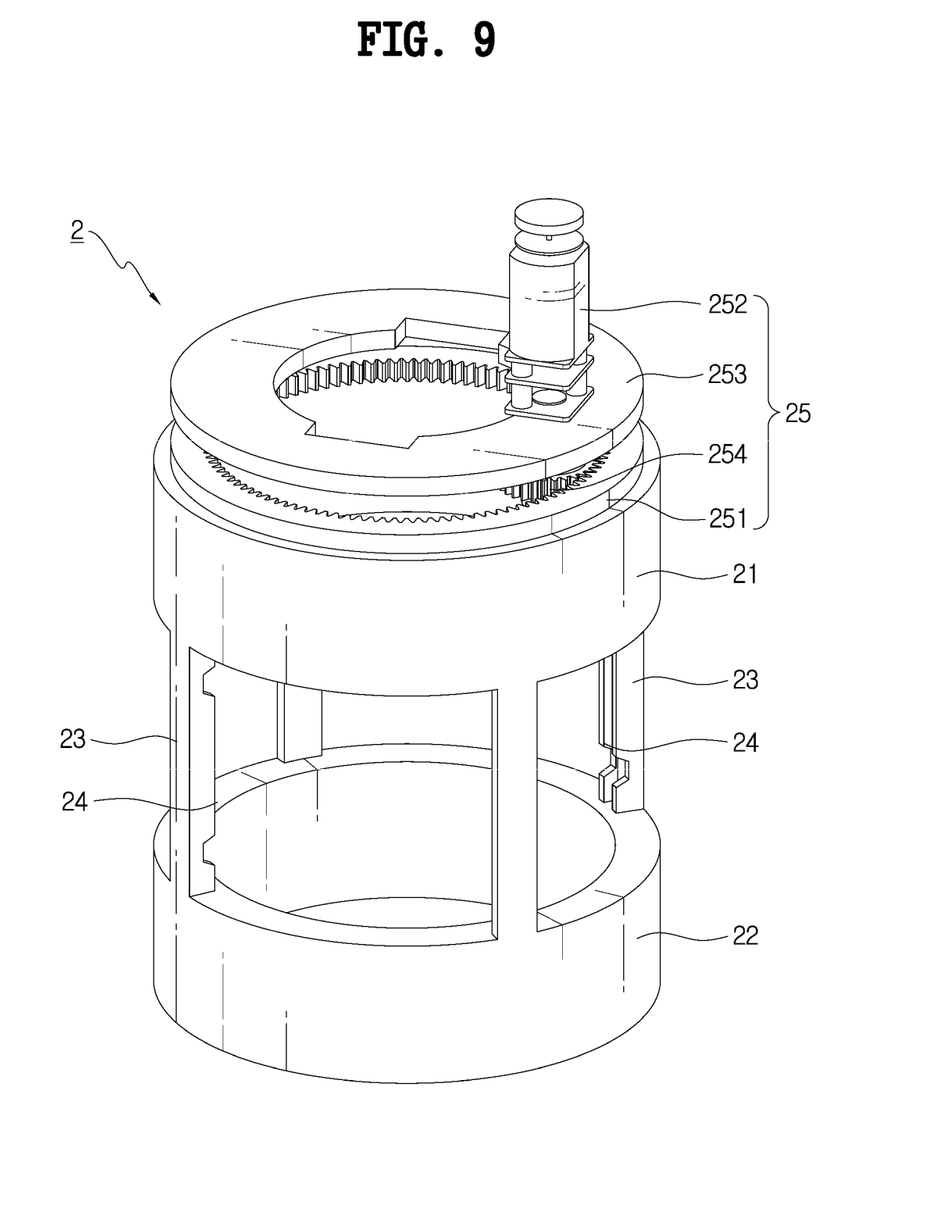
FIG. 9 is a schematic perspective view showing a cleaning module separately of a borehole pressure-shear test apparatus of the present disclosure.

FIG. 9 is a schematic perspective view showing the cleaning module 2 separately. The cleaning module 2 is installed around the part in which the open windows are formed in the main casing 4. The cleaning module 2 includes an upper rotation support ring 21, a lower rotation support ring 22, a plurality of vertical connection elements 23 formed of rod-type elements, cleaning pads 24 to clean up the front surfaces of the shear plates 1 by wiping, and a cleaning rotation driving module 25. The upper rotation support ring 21 is installed around the circumference of the main casing 4 above the open windows. The lower rotation support ring 22 is installed around the circumference of the main casing 4 below the open windows. The upper rotation support ring 21 and the lower rotation support ring 22 are each formed of a circular ring element and they are spaced apart from each other in the vertical direction. The vertical connection elements 23 are vertically arranged to integrally connect the upper and lower rotation support rings 21, 22. Accordingly, an integrated assembly of the upper and lower rotation support rings 21, 22 and the vertical connection elements 23 has a cylindrical shape.

The cylindrical assembly including the upper and lower rotation support rings 21, 22 and the vertical connection elements 23 is installed outside the part in which the open windows are formed in the main casing 4 to surround the main casing 4. In this instance, the open windows of the main casing 4 are disposed between the upper and lower rotation support rings 21, 22. The plurality of vertical connection elements 23 is arranged at a circumferential direction interval that does not interrupt the advance and retreat of the shear plates 1 through the open windows. The upper and lower rotation support rings 21, 22 and the vertical connection elements 23 may be manufactured as separate elements and then assembled and connected together. However, in a cylindrical element such as, for example, a pipe, the side of the shear cylindrical element may be cut such that the remaining part after cutting corresponds to the upper and lower rotation support rings 21, 22 and the vertical connection elements 23. Even though the assembly of the upper and lower rotation support rings 21, 22 and the vertical connection elements 23 is installed around the main casing 4, it is desirable that the borehole pressure-shear test apparatus 100 has a uniform outer diameter in the vertical direction. Accordingly, as shown in the drawing, it is desirable that the main casing 4 reduces in the outer diameter at the part in which the assembly of the upper and lower rotation support rings 21, 22 and the vertical connection elements 23 is installed. When the main casing 4 has the reduced outer diameter, the cylindrical assembly including the upper and lower rotation support rings and the vertical connection elements is covered on the part having the reduced outer diameter in the main casing 4 to surround the main casing 4. According to this configuration, the borehole pressure-shear test apparatus 100 has a uniform outer diameter without any increase in diameter or thickness over the vertical length. Accordingly, there is no inconvenience when inserting or pulling the borehole pressure-shear test apparatus 100 into/out of the borehole in the ground.

The cleaning pads 24 are provided on the inner surfaces of some or all of the vertical connection elements 23. That is, there are vertical connection elements 23 having the cleaning pads 24 on the inner surfaces. The cleaning pads 24 clean up the front surfaces of the shear plates 1 by wiping. To clean up the shear plates 1, when the assembly including the upper and lower rotation support rings 21, 22 and the vertical connection elements 23 rotates, the cleaning pads 24 move in the circumferential direction in close contact with the front surfaces of the shear plates 1 and wipe up to remove impurities attached to the front surfaces of the shear plates 1. It is desirable that the cleaning pads 24 are detachably assembled on the inner surfaces of the vertical connection elements 23 to make it possible to replace the cleaning pads 24.

The assembly including the upper and lower rotation support rings 21, 22 and the vertical connection elements 23 is rotated by the cleaning rotation driving module 25. In the case of the embodiment shown in the drawing, the cleaning rotation driving module 25 includes a gear rotation ring 251, a rotating gear 254 in gear engagement with the gear rotation ring 251, and a motor 252 to drive the rotating gear 254 to rotate. The gear rotation ring 251 is a ring having gears on the circumferential inner surface. The gear rotation ring 251 is rotatably provided within the main casing 4 integrally with the upper rotation support ring 21 above the upper rotation support ring 21. The rotating gear 254 is in gear engagement with the gear rotation ring 251. The rotating gear 254 is rotated by the motor 252.

In the embodiment shown in the drawing, the cleaning rotation driving module 25 includes a fixed ring element 253 to install the motor 252 within the main casing 4. The motor 252 is coupled to the fixed ring element 253. The fixed ring element 253 is fixedly installed within the main casing 4. When the motor 252 operates, the rotating gear 254 rotates. When the rotating gear 254 rotates, the gear rotation ring 251 in gear engagement with the rotating gear 254 rotates. The gear rotation ring 251 is coupled with the assembly of the upper and lower rotation support rings 21, 22 and the vertical connection elements 23. Accordingly, when the gear rotation ring 251 rotates, the assembly of the upper and lower rotation support rings 21, 22 and the vertical connection elements 23 coupled with the gear rotation ring 251 rotates around the main casing 4.

Figure 10:
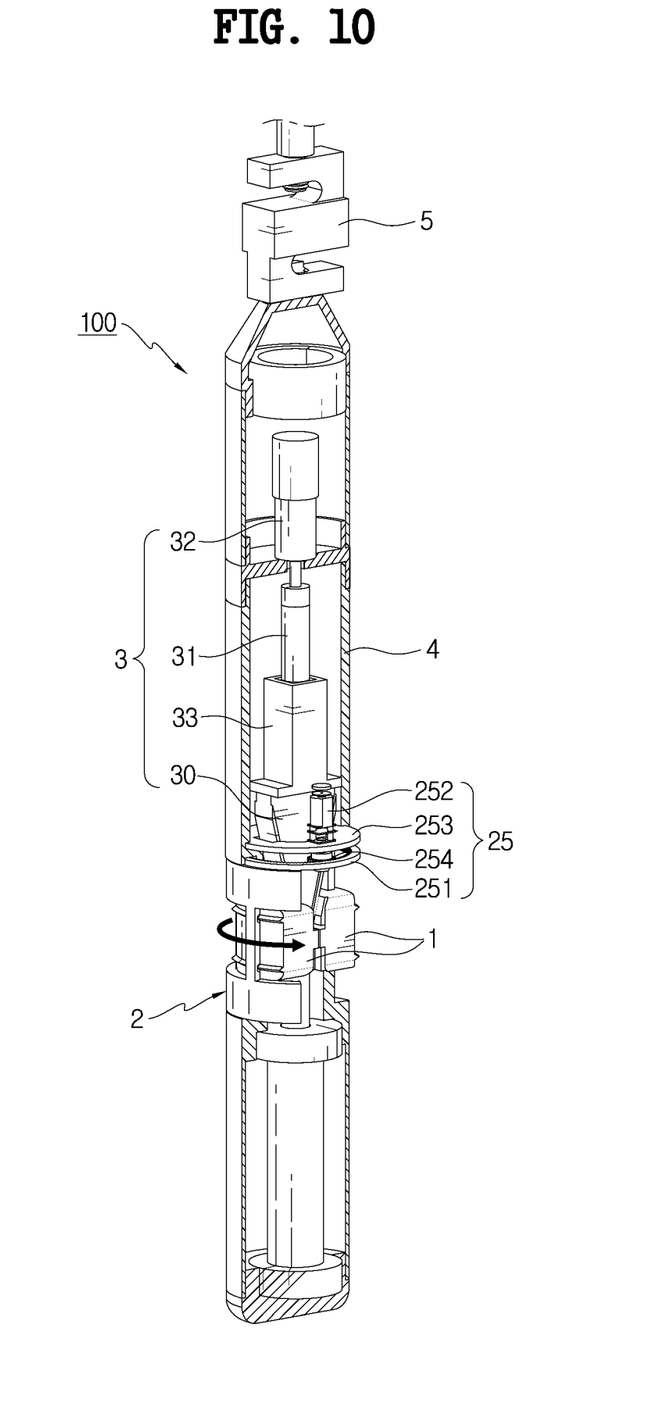
FIG. 10 is a schematic sectional perspective view corresponding to FIG. 3, showing a cleaning operation for shear plates in a borehole pressure-shear test apparatus of the present disclosure.
Figure 11:
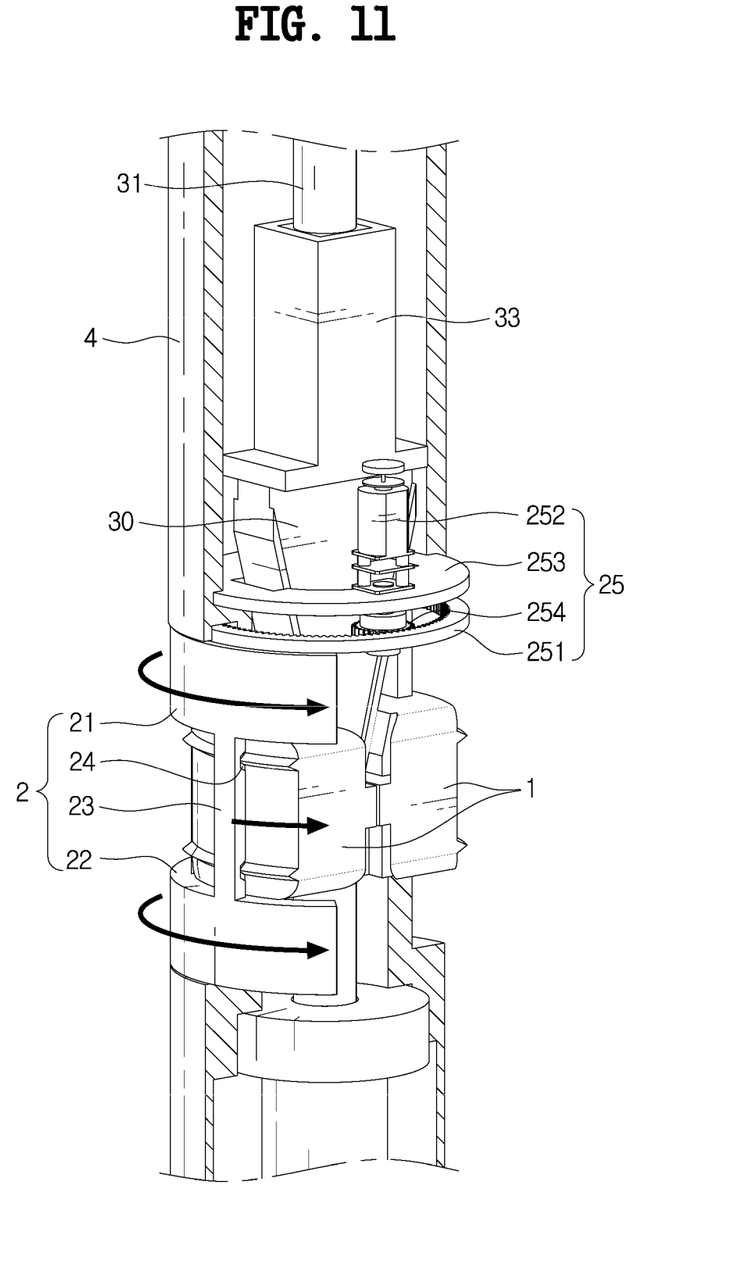
FIG. 11 is a schematic enlarged view corresponding to FIG. 4, showing a cleaning operation for shear plates in a borehole pressure-shear test apparatus of the present disclosure.

FIG. 10 is a schematic sectional perspective view corresponding to FIG. 3, showing a cleaning operation for the shear plates 1 by the cleaning module 2 provided in the borehole pressure-shear test apparatus 100 of the present disclosure. FIG. 11 is a schematic enlarged view corresponding to FIG. 4, showing a cleaning operation for the shear plates 1 by the cleaning module 2 provided in the borehole pressure-shear test apparatus 100 of the present disclosure. When the motor 252 of the cleaning rotation driving module 25 operates, the rotating gear 254 rotates, and accordingly the gear rotation ring 251 rotates. When the gear rotation ring 251 rotates, the assembly of the upper and lower rotation support rings 21, 22 and the vertical connection elements 23 moves in the direction indicated by the arrow in FIGS. 10 and 11 and rotates around the main casing 4, and accordingly the cleaning pads 24 provided on the inner surfaces of the vertical connection elements 23 wipe up the front surfaces of the shear plates 1 to remove impurities. For shearing the borehole wall, the shear plates 1 may have sawtooth on the front surface, and in this case, the cleaning pads 24 preferably have recesses that match the sawtooth on the surface. The sawtooth and recesses bring the cleaning pads 24 into close contact with the front surfaces of the shear plates 1 to allow the cleaning pads 24 to efficiently wipe up the front surfaces of the shear plates 1. The cleaning pads 24 may be formed in the shape of a brush rather than the shape for being in close contact with the front surfaces of the shear plates 1. The assembly of the upper and lower rotation support rings 21, 22 and the vertical connection elements 23 may rotate continuously multiples times to clean the front surfaces of the shear plates 1 more clearly and efficiently. After cleaning is completed, the vertical connection elements 23 move to a location that does not interrupt the advance and retreat of the shear plates 1, and subsequently, the horizontal loading module 3 operates to advance the shear plates 1 in the horizontal direction for an additional borehole shear test.

With the cleaning module 2, it is possible to automatically remove impurities such as residual soils stuck in the shear plates having pressed the borehole wall in an easy way without pulling the borehole pressure-shear test apparatus out of the borehole in the ground after the test is completed. Accordingly, it is possible to perform the test in borehole continuously and efficiently.

INDUSTRIAL APPLICABILITY

According to the present disclosure, it is possible to perform a borehole shear test and a borehole jack test together using one test apparatus.

The invention claimed is:

1. A borehole pressure-shear test apparatus, comprising:
a cylindrical main casing having an open window on a wall;
a horizontal loading module provided within the main casing to convert a vertical load to a horizontal load and apply the horizontal load; and
a pair of shear plates to come into close contact with and shear a borehole wall of a borehole in ground by advancing and retreating in a horizontal direction through the open window of the main casing by the action of the horizontal force of the horizontal loading module,
wherein the horizontal loading module includes a loading motor, a connecting rod that vertically moves up and down by the loading motor, a vertical load meter to measure a vertical load applied by the connecting rod moving up and down, and a wedge element coupled with the connecting rod to move vertically causing the shear plates to advance and retreat in the horizontal direction,
the wedge element has a downward tapered shape such that a distance between two edges is narrower and a cross section is smaller as it goes downwards, and protrusion-type rails are continuously formed at the two edges of the downward tapered part of the wedge element,
the pair of shear plates are each slidably fastened to the two edges of the wedge element, fastening elements are provided on inner surfaces of the shear plates such that the fastening elements surround the rails, and the fastening elements always maintain a fastened state surrounding the rails such that when the fastening elements surround the rails, the fastening elements can freely move along the rails, but the fastening elements cannot move in a direction perpendicular to the rails, so the shear plates can move along the edges of the wedge element,
when the connecting rod and the wedge element move down by the loading motor, because of the downward taped shape of the wedge element such that the edges and the rails each formed at the edges get closer to each other as it goes downwards due to the cross section reducing in size as it goes downwards, the fastening elements of the shear plates fastened to the rails of the wedge element slide up along the rails, and the pair of shear plates are subjected to the horizontal force and horizontally advance to the borehole wall of the borehole in the ground at the same time to press tightly the borehole wall of the borehole in the ground, and horizontal displacement of the borehole wall when pressed by the shear plates is calculated and measured by measuring a vertical displacement at which the connecting rod or the wedge element moved down and calculating a horizontal displacement of the shear plates by calculation based on a geometric shape of the wedge element, and at the same time, a horizontal load applied to the borehole wall is measured by measuring the vertical load applied when the wedge element moves down by the vertical load meter, the connecting rod and the wedge element are configured to move up and the fastening elements of the shear plates relatively slide down along the rails by the operation of the loading motor, to retreat the pair of shear plates inwards after a test is completed, and a borehole shear test for measuring the shear strength of the ground by shearing the borehole wall, and a borehole jack test for measuring the horizontal load applied to the borehole wall by the shear plates and its consequential horizontal displacement of the borehole wall are all performed.

2. The borehole pressure-shear test apparatus according to claim 1, further comprising:

a cleaning module to clean up to remove impurities stuck in front surfaces of the shear plates having retreated in the horizontal direction after shearing is completed, wherein the cleaning module includes:

an upper rotation support ring and a lower rotation support ring surrounding a circumference of the main casing above and below the open window of the main casing respectively, a plurality of vertical connection elements integrally connecting the upper and lower rotation support rings, cleaning pads provided on inner surfaces of all or some of the vertical connection elements, and a cleaning rotation driving module to rotate an integrated assembly including the upper and lower rotation support rings and the vertical connection elements, and while the cylindrical assembly including the upper and lower rotation support rings and the vertical connection elements rotates by operation of the cleaning rotation driving module, the cleaning pads clean up the front surfaces of the shear plates by wiping.

3. The borehole pressure-shear test apparatus according to claim 2, wherein the cleaning rotation driving module includes a gear rotation ring having gears on a circumferential inner surface and rotatably provided within the main casing above the upper rotation support ring integrally with the upper rotation support ring, a motor having a rotating gear in gear engagement with the gear rotation ring to drive the rotating gear to rotate, and a fixed ring element disposed within the main casing and to which the motor is fixed, and when the motor operates, the rotating gear rotates, and accordingly the gear rotation ring in gear engagement with the rotating gear rotates, and the assembly of the upper and lower rotation support rings and the vertical connection elements coupled with the gear rotation ring rotates around the main casing.

\* \* \* \* \*